(12) United States Patent
Maskell

(10) Patent No.: US 11,090,999 B2
(45) Date of Patent: Aug. 17, 2021

(54) DOOR PROTECTION SYSTEM AND METHOD

(71) Applicant: JAGUAR LAND ROVER LIMITED, Coventry (GB)

(72) Inventor: Andrew Maskell, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 122 days.

(21) Appl. No.: 16/062,531

(22) PCT Filed: Dec. 12, 2016

(86) PCT No.: PCT/EP2016/080689
§ 371 (c)(1),
(2) Date: Jun. 14, 2018

(87) PCT Pub. No.: WO2017/102664
PCT Pub. Date: Jun. 22, 2017

(65) Prior Publication Data
US 2018/0370318 A1    Dec. 27, 2018

(30) Foreign Application Priority Data
Dec. 18, 2015  (GB) ..................... 1522354

(51) Int. Cl.
*B60G 17/017*  (2006.01)
*B60G 17/019*  (2006.01)
*B60R 13/04*    (2006.01)

(52) U.S. Cl.
CPC ......... *B60G 17/017* (2013.01); *B60G 17/019* (2013.01); *B60G 2400/952* (2013.01); *B60G 2500/30* (2013.01); *B60R 13/043* (2013.01)

(58) Field of Classification Search
CPC ............... B60G 17/017; B60G 17/019; B60G 2400/952; B60G 2500/30; E05F 15/40
See application file for complete search history.

(56) References Cited

U.S. PATENT DOCUMENTS 10,093,310 B2\* 10/2018 Lee .................... B60G 17/0164
10,300,758 B2\* 5/2019 Guest .................. B60G 17/016
(Continued)

FOREIGN PATENT DOCUMENTS

CN          1572551 A      2/2005
CN        103707833 A      4/2014
(Continued)

OTHER PUBLICATIONS

International Search Report and Written Opinion, PCT/EP2016/080689, dated Apr. 3, 2017, 28 pages.

*Primary Examiner* — Faye M Fleming
(74) *Attorney, Agent, or Firm* — McCoy Russell LLP

(57) ABSTRACT

The present disclosure relates to a door protection system (2) for a vehicle (1). The door protection system (2) includes sensor means (10, 11) for detecting an object (O) proximal to the vehicle (1). Processing means (14) are provided to process a signal (S1, S2) received from said sensor means (10, 11) to determine if the detected object (O) obstructs opening of a vehicle door (5, 6). Output means are provided for outputting a suspension control signal ($S_{SUS}$) to control operation of a vehicle suspension (7) dependence on determining that the detected object (O) obstructs opening of the vehicle door (5, 6). The present disclosure also relates to a vehicle (1); to a method of controlling operation of a vehicle suspension (7); and to an electronic processor (14).

15 Claims, 3 Drawing Sheets

(56) References Cited

U.S. PATENT DOCUMENTS

| | | | |
|---|---|---|---|
| 10,443,287 B2* | 10/2019 | Elie | G01D 5/34 |
| 2005/0010344 A1 | 1/2005 | Misawa | |
| 2011/0018219 A1* | 1/2011 | Oriet | B60G 5/04 |
| | | | 280/124.112 |
| 2014/0092249 A1 | 4/2014 | Freiburger | |
| 2015/0145220 A1 | 5/2015 | Yellambalase et al. | |
| 2019/0024430 A1* | 1/2019 | Jeromin | E05F 15/40 |

FOREIGN PATENT DOCUMENTS

| | | | | |
|---|---|---|---|---|
| CN | 204432293 U | | 7/2015 | |
| DE | 102014016030 A1 | * | 5/2016 | G01S 13/93 |
| JP | 2008293210 A | | 12/2008 | |
| KR | 20020095962 A | | 12/2002 | |
| KR | 20090064232 | * | 6/2009 | B60G 17/0525 |
| KR | 20120050272 | * | 5/2012 | B60W 10/22 |

* cited by examiner

DOOR PROTECTION SYSTEM AND METHOD

CROSS-REFERENCE TO RELATED APPLICATIONS

This application is a 371 of International Application No. PCT/EP2016/080689, filed Dec. 12, 2016, which claims priority to GB Patent Application 1522354.8, filed Dec. 18, 2015, the contents of both of which are incorporated by reference herein in their entirety.

TECHNICAL FIELD

The present disclosure relates to a door protection system and method. More particularly, but not exclusively, the present disclosure relates to a door protection system for a vehicle; to a vehicle; to a method of controlling a vehicle suspension to protect a vehicle door; and to an electronic processor.

BACKGROUND

A vehicle may be parked next to an object which will obstruct opening of one or more doors. If the vehicle is an off-road vehicle, such as a utility vehicle or a sports utility vehicle, the obstruction may be a feature in the ground or terrain, for example a rut, a boulder or a bank. An occupant of the vehicle may be unaware of the object and may open the door into the object which may result in damage to the vehicle. Equally, it may be difficult for the occupant of the vehicle to determine with certainty if the vehicle door will open without colliding with the object. This is particularly problematic for low-level obstructions which may clash with the bottom of the door as it is opened.

The aforementioned problem may be exacerbated if the vehicle has an active suspension operable to vary the ride height of the vehicle. In certain vehicles, the suspension operates to lower the height of the vehicle to facilitate ingress/egress from the cabin. This change in height may affect clearance for the door as it is opened.

At least in certain embodiments, the present invention seeks to overcome or ameliorate at least some of the problems associated with prior art arrangements.

SUMMARY OF THE INVENTION

Aspects and embodiments of the invention provide a door protection system for a vehicle; a vehicle; a method of controlling a vehicle suspension to protect a vehicle door; and an electronic processor as claimed in the appended claims.

According to a further aspect of the present invention there is provided a door protection system for a vehicle, the door protection system comprising:
  means for detecting an object proximal to the vehicle; and
  means for receiving a signal from said detecting means;
  means for processing the signal to determine if the detected object obstructs opening of a vehicle door; and
  means for outputting a suspension control signal for controlling operation of a vehicle suspension in dependence on determining that the detected object obstructs opening of the vehicle door. The door protection system controls the vehicle suspension to reduce the likelihood of the door being damaged by opening into an obstruction. The door protection system detects objects that obstruct opening of the vehicle door(s) and may cause damage to the vehicle if the door is opened. The suspension control signal may inhibit lowering of the vehicle suspension to a point where the detected object may obstruct opening of the door.

A door protection system as described above, wherein:
  said means for detecting an object proximal to the vehicle comprises at least one sensor;
  said means for receiving a signal from said sensor means comprises an electronic processor having an electrical input for receiving said one or more signals; and
  an electronic memory device electrically coupled to the electronic processor and having instructions stored therein;
  said means for processing the signal to determine if the detected object obstructs opening of the vehicle door and said means for outputting the suspension control signal for controlling operation of the vehicle suspension comprises the processor being configured to access the memory device and execute the instructions stored therein such that it is operable to control operation of the vehicle suspension in dependence on determining that the detected object obstructs opening of the vehicle door.

The door protection system may be used in an off-road scenario where the ground around the vehicle is uneven. The detected object may comprise a feature of the ground proximal to the vehicle, for example a gradient change.

The processing means may be configured to process said signal to determine a relative position and/or height of the detected object. The sensor means may determine the height of the ground beneath the door opening area and therefore determine whether to warn the occupants or to inhibit the lowering of the vehicle.

The suspension control signal may control operation of the vehicle suspension to adjust the height and/or orientation of the vehicle such that the detected object does not obstruct opening of the vehicle door. The vehicle suspension change may comprise adjusting a ride height of the vehicle. The vehicle suspension change may comprise adjusting a roll angle and/or a pitch angle of the vehicle. The roll angle may be adjusted by varying the height of the vehicle suspension on each side of the vehicle. The pitch angle may be adjusted by varying the height of the vehicle suspension at the front and rear of the vehicle.

The suspension control signal may partially inhibit operation of the vehicle suspension, for example to reduce or limit travel of the vehicle suspension, in dependence on said detected object. The suspension control signal may comprise an upper suspension limit to set a limit for raising the vehicle suspension. The suspension control signal may comprise a lower suspension limit to set a limit for lowering the vehicle suspension. The upper suspension limit and/or the lower suspension limit may be determined in dependence on the detected object. The upper suspension limit may be set to inhibit raising the vehicle suspension such that the vehicle door would collide with an obstacle which is above the vehicle door before the vehicle suspension is operated. The lower suspension limit may be set to inhibit lowering the vehicle suspension such that the vehicle door would collide with a detected obstacle which is below the vehicle door before the vehicle suspension is operated.

The suspension control signal may control operation of the vehicle suspension automatically or semi-automatically. The suspension control signal may initiate a user prompt to confirm vehicle suspension changes. The user prompt may be output to a display screen, for example in an instrument cluster or a centre console of the vehicle. The user may confirm changes to the vehicle suspension using a suitable human machine interface, for example comprising a touchscreen, a switch or a button.

The suspension control signal may inhibit operation of the vehicle suspension subject to a user input to approve vehicle suspension changes. The suspension control signal may inhibit an automated operation of the vehicle suspension. The automated operation of the vehicle suspension may comprise adjusting the vehicle suspension to a predetermined height, for example to an access height.

The processing means may be configured to determine that the detected object obstructs opening of the vehicle door prior to implementing a vehicle suspension change. The operation of the vehicle suspension may be enabled only if there are no detected objects in the projected opening path of the vehicle door.

The processing means may be configured to determine if a requested vehicle suspension change would result in the detected object obstructing opening of the vehicle door. The processing means may thereby predict whether a requested vehicle suspension change would result in the vehicle door being obstructed. The requested vehicle suspension change may be implemented automatically or in dependence on a user input. The processing means may be configured to inhibit the requested vehicle suspension change and/or to require user confirmation to proceed with the requested vehicle suspension change.

In dependence on determining that the detected object obstructs opening of the vehicle door, the processing means may be configured to output an alert. The alert may be an audio alert and/or a visual alert and/or a haptic alert.

The processing means may determine whether the detected object is within a projected opening path of a vehicle door.

The vehicle door may be for ingress/egress to the vehicle cabin. The vehicle door may open outwardly to a side of the vehicle. The sensor means may be configured to detect an object alongside the vehicle. Alternatively, or in addition, the vehicle door may be an access door, for example disposed at the rear of the vehicle, to provide access to a load area. In this arrangement, the sensor means may be configured to detect an object at the rear of the vehicle.

The sensor means may comprise at least one sensor. The sensor means may comprise an ultrasonic sensor. The sensor means may comprise one or more camera. The one or more camera may generate image data which is processed by said processing means. The sensor means may be a stereoscopic camera.

The sensor means may be mounted in a door mirror housing. The sensor means may determine the vertical distance between the camera and the ground and therefore whether the ground would obstruct opening of the door. Alternatively, the sensor means may be mounted to the vehicle door, for example to the bottom of the vehicle door.

According to a further aspect of the present invention there is provided a vehicle comprising a door protection system as described herein.

According to a still further aspect of the present invention there is provided a method of controlling a vehicle suspension to protect a vehicle door, the method comprising:
  detecting an object obstructing opening of a vehicle door; and
  controlling operation of the vehicle suspension in dependence on determining that the detected object obstructs opening of the vehicle door.

The method may comprise determining a relative position and/or height of the detected object.

The method may comprise adjusting the height and/or orientation of the vehicle such that the detected object does not obstruct opening of the vehicle door. The method may comprise implementing a vehicle suspension change.

The method may comprise generating a user prompt to confirm vehicle suspension changes.

The method may comprise inhibiting operation of the vehicle suspension subject to a user input to approve vehicle suspension changes.

The method may comprise inhibiting automated operation of the vehicle suspension.

The method may comprise determining whether the detected object obstructs opening of the vehicle door prior to implementing a vehicle suspension change.

The method may comprise determining if a requested vehicle suspension change would result in the detected object obstructing opening of the vehicle door. The method may comprise inhibiting the requested vehicle suspension change and/or requiring user confirmation to proceed with the requested vehicle suspension change.

The method may comprise outputting an alert when the detected object obstructs opening of the vehicle door.

The method may comprise determining if the detected object obstructs opening of the vehicle door by determining if the detected object is within a projected opening path of the vehicle door.

According to a further aspect of the present invention there is provided an electronic processor configured to execute a set of computational instructions to perform the method(s) described herein. The computational instructions may be stored in system memory or on a non-transitory computer-readable media.

As used herein the term "processor" will be understood to include both a single processor and a plurality of processors collectively operating to provide any stated control functionality. To configure a processor, a suitable set of instructions may be provided which, when executed, cause said processor to implement the control techniques specified herein. The set of instructions may suitably be embedded in said one or more processors. Alternatively, the set of instructions may be provided as software saved on one or more memory associated with said processor to be executed on said computational device. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A vehicle 1 comprising a door protection system 2 in accordance with an embodiment of the present invention will now be described with reference to the accompanying figures. The vehicle 1 in the present embodiment is a sports utility vehicle, but it will be appreciated that the present invention is not limited in this respect.

Figure 1:
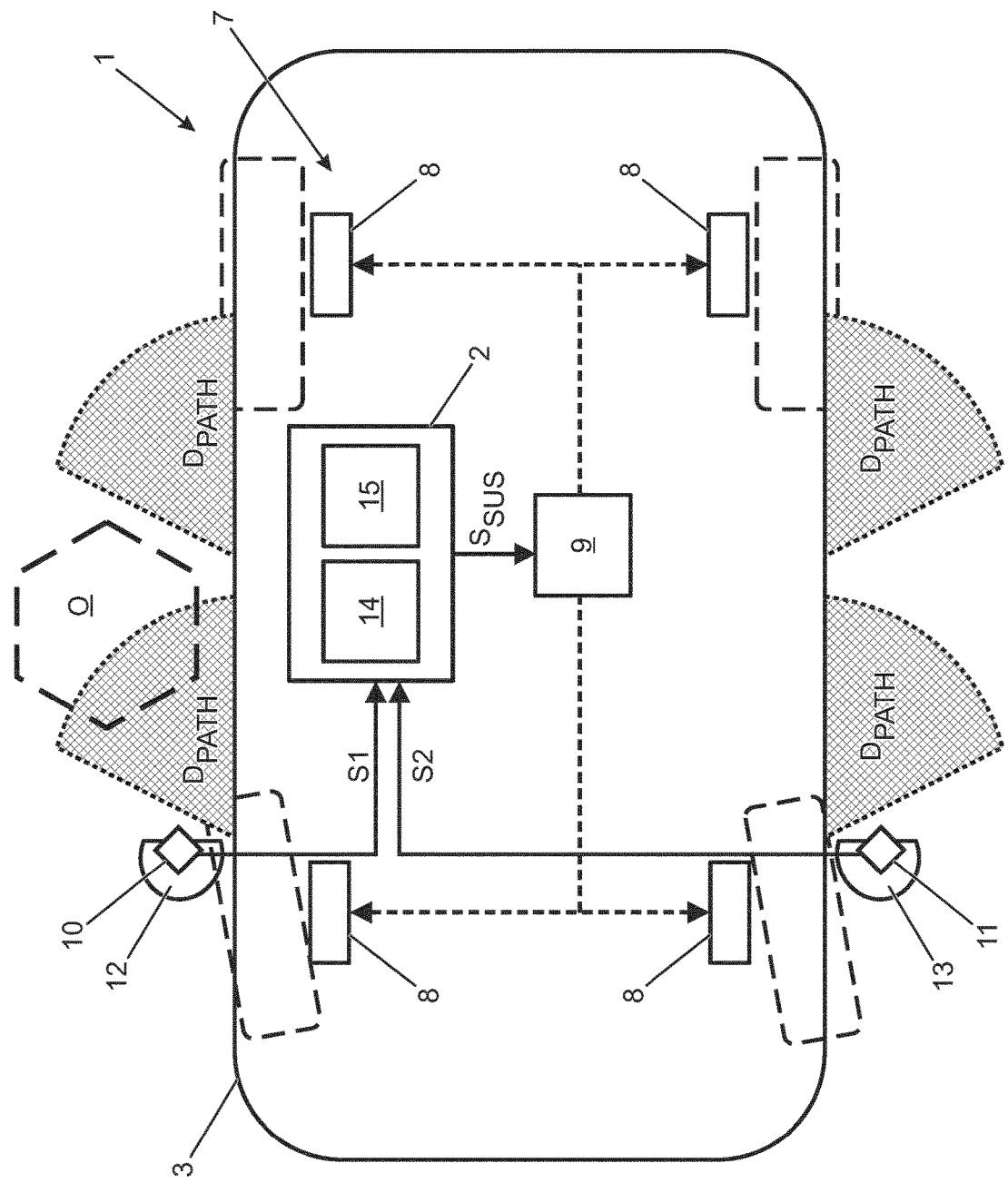
FIG. 1 shows a schematic representation of a vehicle incorporating a door protection system in accordance with an embodiment of the present invention.

The vehicle 1 has a body 3 comprising a cabin 4 for occupants. The body 3 has a plurality of doors 5 for occupant ingress and egress; and a tailgate 6 for access to a load area. The doors 5 are pivotally mounted and open outwardly in conventional manner to provide access to the cabin 4. As shown schematically in FIG. 1, the vehicle 1 comprises an active suspension (denoted generally by the reference numeral 7) which is operable to adjust the height of the body 3. In the present embodiment, the vehicle suspension 7 is an air suspension comprising a plurality of pneumatic actuators 8 connected to a high pressure air supply (not shown), such as a compressor. A suspension control unit 9 controls operation of the vehicle suspension 7.

The door protection system 2 is operative to determine when one or more of the doors 5 is obstructed such that opening of the vehicle door 5 would be partially or fully hindered or impeded by an obstacle. In particular, the door protection system 2 is operative to detect any objects O disposed proximal to the vehicle 1 which will obstruct opening of one or more of the vehicle doors 5. The object(s) O may, for example, be a feature of the ground or terrain. As described herein, the door protection system 2 controls operation of the vehicle suspension 7 in dependence on detection of an object O within an opening path of one or more of said vehicle doors 5. The opening path is the three-dimensional volume swept by the vehicle door 5 as it pivots to a predefined open position. The predefined open position corresponds to a predefined angular opening for the vehicle door 5, for example an angular opening of 40°. The opening path may be modelled and this virtual representation (shown in FIG. 1 for each vehicle door 5) is referred to herein as a projected opening path $D_{PATH}$. It will be appreciated that the projected opening path $D_{PATH}$ is offset vertically from the ground by a distance which varies in dependence on the height of the vehicle suspension 7. Moreover, the angular orientation of the projected opening path $D_{PATH}$ may vary in dependence on the orientation of the vehicle 1 about a longitudinal axis (roll) and/or a transverse axis (pitch). The orientation of the vehicle 1 may be measured by a roll sensor and/or a pitch sensor.

The door protection system 2 comprises sensor means in the form of first and second sensors 10, 11 disposed on the left and right hand sides of the vehicle 1. In the present embodiment the first and second sensors 10, 11 are imaging sensors, for example a stereoscopic camera, mounted in left and right side mirror housings 12, 13 respectively. The first and second sensors 10, 11 have respective first and second active imaging zones extending along the left and right hand sides of the vehicle 1 adjacent to the doors 5. In an alternative embodiment, the first and second sensors 10, 11 may each comprise one or more ultrasonic sensors.

The first and second sensors 10, 11 are connected to processing means in the form of an electronic processor 14.

Figure 2:
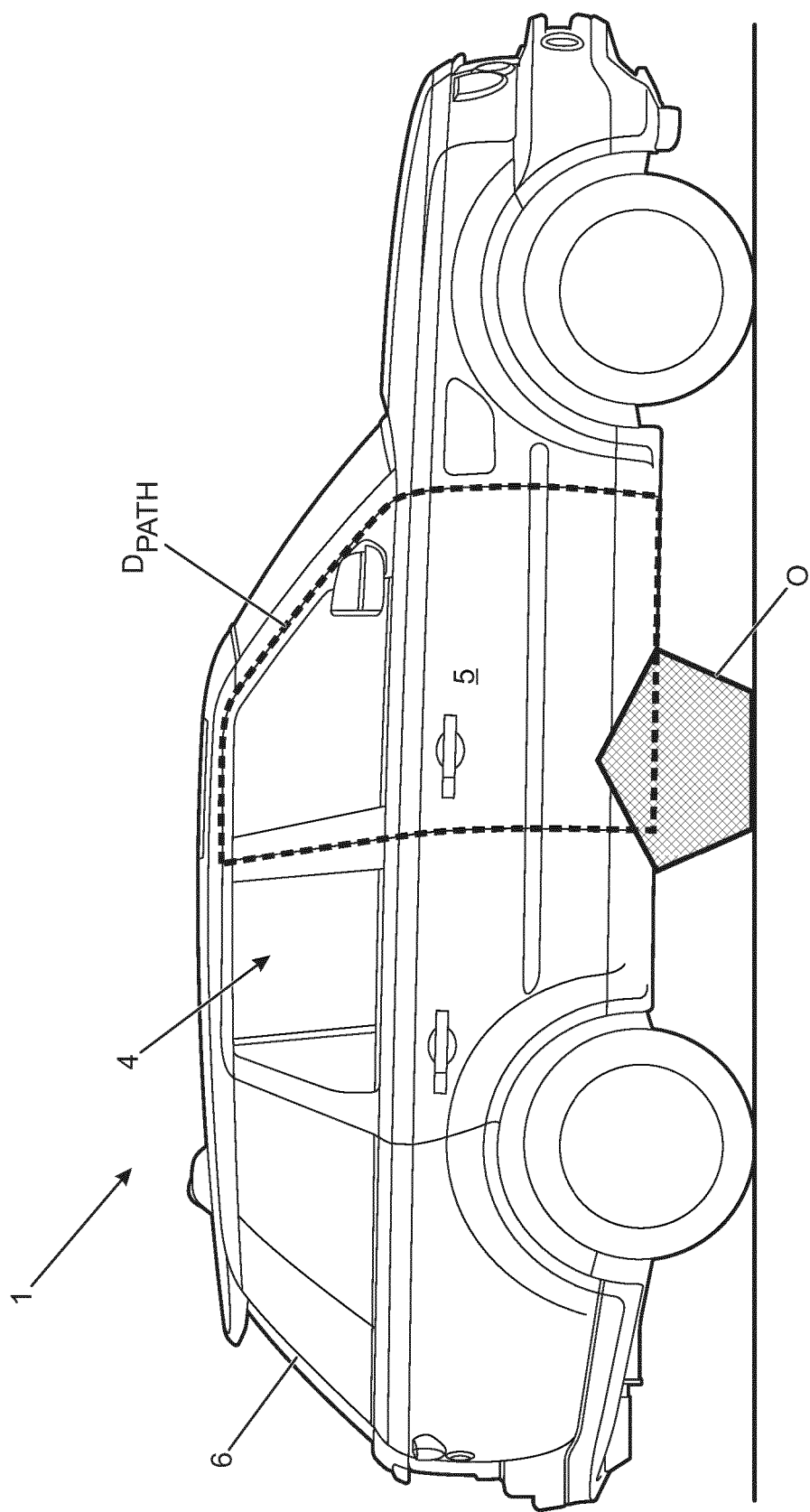
FIG. 2 shows a side elevation of the vehicle shown in FIG. 1.

The electronic processor 14 is configured to execute a set of computational instructions stored in an electronic memory device 15. The first and second sensors 10, 11 output first and second signals S1, S2 to the electronic processor 14. The electronic processor 14 is configured to process said first and second signals S1, S2 to detect one or more object(s) O proximal to the vehicle 1. The first and second sensors 10, 11 perform a scanning function of the ground proximal to the vehicle 1. The electronic processor 14 receives said first and second sensors 10, 11 and generates a three-dimensional map which is defined relative to a reference point, such as a camera position or a vehicle centre point. The electronic processor 14 analyses the three-dimensional map to detect said one or more object O proximal to the vehicle 1. The electronic processor 14 is configured to determine the position of each detected object O relative to the vehicle 1, for example in relation to the predefined reference point. As illustrated in FIG. 2, the electronic processor 14 also determines the vertical height of each detected object O. By determining the vertical height of the detected object O, the door protection system 2 can be used to detect relatively low-level objects O coincident with the bottom of the vehicle door 5. The electronic processor 14 may optionally also determine the shape of each detected object O.

The electronic processor 14 is configured to model the projected opening path $D_{PATH}$ for each vehicle door 5. The projected opening path $D_{PATH}$ is modelled as a three-dimensional swept volume coincident with each vehicle door 5. In alternative embodiments, the projected opening path $D_{PATH}$ may comprise geometric shape(s) or primitive(s) to represent the path of the outer extremities of the vehicle doors 5. The projected opening path $D_{PATH}$ of each vehicle door 5 may be defined relative to the same reference point as the three-dimensional map generated in dependence on the first and second signals S1, S2 generated by the first and second sensors 10, 11. The electronic processor 14 is configured to determine if the detected object O is disposed within the projected opening path $D_{PATH}$ and to thereby determine if the vehicle door 5 is obstructed. If the detected object O is within the projected opening path $D_{PATH}$, the electronic processor 14 determines that the object O represents an obstacle which is obstructing opening of that particular vehicle door 5. The electronic processor 14 may optionally be configured to determine if the vehicle suspension 7 may be raised to increase the height of the body 3 such that the detected object O no longer obstructs opening of the vehicle door 5. Alternatively, or in addition, the electronic processor 14 may be configured to determine if operating the vehicle suspension 7, for example in dependence on a requested vehicle suspension change, to adjust the height of the body 3 will result in the detected object O obstructing opening of the vehicle door 5. The object O may not previously have obstructed opening of the vehicle door 5 but the electronic processor 14 may determine that implementing the requested vehicle suspension change would result in the object O obstructing opening of the vehicle door 5. In order to determine if a change in the height of the vehicle suspension 7 would result in an object O obstructing the vehicle door 5, a vertical offset corresponding to the height of the requested vehicle suspension change is applied to the projected opening path $D_{PATH}$ of each vehicle door 5 or to the detected location of an obstacle O. A check is performed to determine if the change in the height of the body 3 would result in interference between the object O and the projected opening path $D_{PATH}$ of each vehicle door 5. The identification of any such interference is an indicator that the object O will obstruct opening of the vehicle door 5 after the change in height of the body 3. The electronic processor 14 outputs a suspension control signal $S_{SUS}$ in dependence on the analysis of one or more of these scenarios. The electronic processor 14 may also generate an alert to notify an occupant of the cabin 4 that the vehicle door 5 is obstructed.

The suspension control signal $S_{SUS}$ is output to the suspension control unit 9, for example over a vehicle communication bus, to control operation of the vehicle suspension 7. The suspension control signal $S_{SUS}$ in the present embodiment inhibits operation of the vehicle suspension 7 and requires user confirmation before re-instating operation of the vehicle suspension 7. This functionality may be suitable for inhibiting automated operation of the vehicle suspension 7. For example, when the vehicle 1 is stationary, the suspension control unit 9 may optionally be configured to control the vehicle suspension 7 automatically to lower the body 3 to a predefined access height to facilitate access to the vehicle 1. If the electronic processor 14 detects an object O within the projected opening path $D_{PATH}$ of one of the doors 5, the suspension control signal $S_{SUS}$ is output to inhibit operation of the vehicle suspension 7 to lower the body 3 to the predefined access height. A prompt may be output to require that the driver confirms operation of the vehicle suspension 7. If the electronic processor 14 does not detect an object O within the projected opening path $D_{PATH}$, the vehicle suspension 7 operates in conventional manner to lower the height of the body 3 to the predefined access height. The door protection system 2 continues to operate to detect objects O during and/or after operation of the vehicle suspension 7. If the door protection system 2 detects an object O after the vehicle suspension 7 has operated, the door protection system 2 outputs an alert within the cabin 4 to advise that the vehicle door 5 may be obstructed. The alert may be an audio alert and/or a visual alert and/or a haptic alert.

Figure 3:
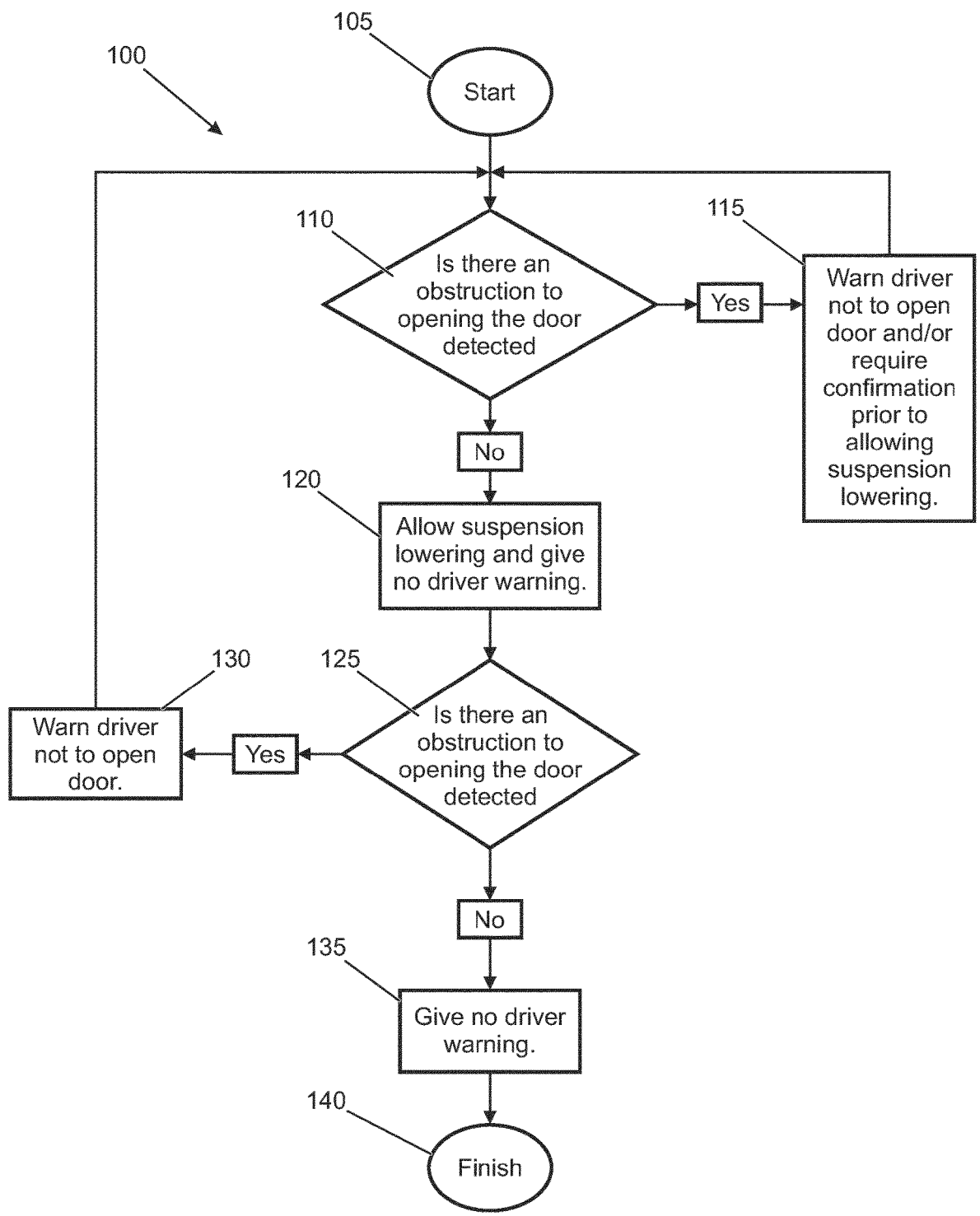
FIG. 3 shows a flow diagram representing operation of the door protection system in accordance with an embodiment of the present invention.

It will be appreciated that operation of the door protection system 2 is the same for each of the doors 5 of the vehicle 1. However, for the sake of brevity, operation will be described with reference to only one of the doors 5. In the present case, the door protection system 2 will be described with reference to the front right door 5, as highlighted in FIG. 2. The operation of the door protection system 2 will now be described with reference to a flow chart 100 shown in FIG. 3. A request is generated to lower the height of the vehicle suspension 7 to the access height. The door protection system 2 is activated (STEP 105). The electronic processor 14 then performs a check to determine if there is an obstruction to opening the vehicle door 5 (STEP 110). The electronic processor 14 analyses the first and second signals S1, S2 to detect an object O. If the electronic processor 14 detects an object O, a check is performed to determine whether the detected object O will obstruct opening of the vehicle door 5. In particular, the electronic processor 14 determines if the detected object O is within the projected opening path $D_{PATH}$. If the electronic processor 14 determines that there is an obstruction, an alert is output to the driver to warn them not to open the vehicle door 5 and/or to require confirmation prior to allowing operation of the vehicle suspension 7 to lower the body 3 (STEP 115). The suspension control signal $S_{SUS}$ is output to inhibit operation of the vehicle suspension 7. If the electronic processor 14 determines that there is no obstruction (either there is no object O detected or the detected object O is outside the projected opening path $D_{PATH}$), the vehicle suspension 7 operates to lower the body 3 to the predefined access height without outputting an alert (STEP 120). It will be appreciated that the location of the projected opening path $D_{PATH}$ changes as the vehicle suspension 7 operates to adjust the height of the body 3. The electronic processor 14 performs a check to determine if there is an obstruction to opening the vehicle door 5 (STEP 125). In particular, the electronic processor 14 determines if an object O is within the projected opening path $D_{PATH}$. If the electronic processor 14 determines that there is an obstruction, an alert is output to the driver to warn them not to open the vehicle door 5 (STEP 130). If the electronic processor 14 determines that there is not an obstruction, no alert is output to the driver (STEP 135). The operating procedure then terminates (STEP 140).

If the electronic processor 14 determines that operating the vehicle suspension 7 will result in a detected object O obstructing opening of the vehicle door 5, an alert may be output to the driver prior to operating the vehicle suspension 7. The alert may, for example, advise the driver that the opening of the vehicle door 5 will be obstructed if the vehicle suspension 7 is operated. The electronic processor 154 may require confirmation from the user prior to implementing a requested change to the vehicle suspension 7. Alternatively, an alert may be output after the vehicle suspension 7 has been operated to change the height of the body 3. For example, an alert may be output to notify the driver that the vehicle door 5 is obstructed.

In a further modification, the electronic processor 14 may be configured to modify the requested change to the vehicle suspension 7 in dependence on the determined height and/or position of a detected object O. The electronic processor 14 may limit changes in the vehicle suspension 7 to maintain the one or more vehicle door 5 clear of the detected object O. In particular, the electronic processor 14 may control operation of the vehicle suspension 7 to ensure that the projected opening path $D_{PATH}$ is spatially separated from the object O. By way of example, if the total available travel on the vehicle suspension 7 is 5 cm, the electronic processor 14 may limit travel to 2 cm to maintain the vehicle door 5 clear of the detected object O. The permitted travel for the vehicle suspension 7 may be determined in dependence on the relative position and/or height of the detected object O. The electronic processor 14 could be configured to generate an alert to notify the driver that the vehicle door 5 can be opened only partially due to the presence of the detected object O. For example, the electronic processor 14 can be configured to determine when fully opening the vehicle door 5 would cause the vehicle door 5 to contact the detected object O. The alert could be output when the vehicle 1 is stopped and/or if a door handle is operated to open the vehicle door 5.

It will be appreciated that various changes and modifications may be made to the door protection system 1 as described herein without departing from the present invention. For example, the door protection system 2 has been described with reference to the doors 5 for providing ingress/egress to the cabin 4. However, the door protection system 2 may also be implemented in conjunction with the tailgate 6. The tailgate 6 may comprise a rear access door which is hingedly mounted to the body 3. The tailgate 6 may be hingedly mounted to the body 3 and configured to open upwardly, downwardly or laterally. The projected opening path $D_{PATH}$ can be determined based on the hinge arrangement of the tailgate 6. The door protection system 2 may utilise one or more sensor provided at the rear of the vehicle 1 to detect an object O which may obstruct opening of the tailgate 6. For example, the door protection system 2 may utilise a rear-facing camera, such as a reversing camera; and/or an ultrasonic sensor, such as a parking sensor. A sensor could be incorporated into the shark fin antenna on a roof of the vehicle 1. The one or more sensor may be provided in the tailgate 6. The electronic processor 14 may process a signal from said one or more sensor to detect an object O which would obstruct opening of the tailgate 6. The electronic processor 14 may detect the object O prior to opening the tailgate 6 and/or as the tailgate 6 is opened. The electronic processor 14 can control operation of the vehicle suspension 7 in dependence on detection of the object O. The rear-facing camera may be a stereoscopic camera to facilitate detection of the object O.

In a further arrangement, the door protection system 2 may be implemented in conjunction with a bonnet (not shown) of the vehicle 1. The electronic processor 14 could receive a signal from a forward-facing stereoscopic camera fitted to an upper area of a windscreen, for example used in conjunction with an Automated Emergency Braking system.

The door protection system 2 described herein utilises first and second sensors 10, 11 to generate the three-dimensional map of the region proximal to the vehicle 1. In an alternate embodiment, a sensor may be provided to detect an object O below the level of the vehicle door 5. The sensor could, for example, be disposed at the base of each vehicle door 5 or in a side sill of the body 3. A warning may be issued when the object O is detected below the level of the vehicle door 5 as the vehicle suspension 7 is operating to lower the body 3.

The invention claimed is:

1. A door protection system for a vehicle, the door protection system comprising:
   means for detecting an object proximal to the vehicle;
   means for receiving a signal from said detecting means;
   means for processing the signal to determine if the detected object obstructs opening of a vehicle door; and
   means for outputting a suspension control signal for controlling operation of a vehicle suspension based on determining that the detected object obstructs opening of the vehicle door;
   wherein the suspension control signal inhibits operation of the vehicle suspension subject to a user input to approve vehicle suspension changes and further wherein the suspension control signal inhibits an automated operation of the vehicle suspension,
   wherein the suspension control signal comprises either or both an upper suspension limit to set a limit for raising the vehicle suspension and a lower suspension limit to set a limit for lowering the vehicle suspension, the upper suspension limit being determined based on the detected object, and the lower suspension limit being determined based on the detected object.

2. A door protection system as claimed in claim 1, wherein the processing means is configured to process said signal to determine a relative position and/or height of the detected object.

3. A door protection system as claimed in claim 2, wherein the suspension control signal controls operation of the vehicle suspension to adjust the height and/or orientation of the vehicle such that the detected object does not obstruct opening of the vehicle door.

4. A door protection system as claimed in claim 1, wherein the processing means is configured to determine that the detected object obstructs opening of the vehicle door prior to implementing a vehicle suspension change.

5. A vehicle comprising a door protection system as claimed in claim 1.

6. A door protection system for a vehicle, the door protection system comprising:
   means for detecting an object proximal to the vehicle;
   means for receiving a signal from said detecting means;
   means for processing the signal to determine if the detected object obstructs opening of a vehicle door; and
   means for outputting a suspension control signal for controlling operation of a vehicle suspension in dependence on determining that the detected object obstructs opening of the vehicle door;
   wherein the processing means is configured to determine if a requested vehicle suspension change would result in the detected object obstructing opening of the vehicle door,
   wherein the processing means is further configured to inhibit the requested vehicle suspension change and/or to require user confirmation to proceed with the requested vehicle suspension change.

7. A door protection system as claimed in claim 6, wherein, in dependence on determining that the detected object obstructs opening of the vehicle door, the processing means is configured to output an alert.

8. A door protection method for a vehicle, the door protection method comprising:
   receiving a signal corresponding to a detected object proximal to the vehicle;
   processing the received signal to determine if the detected object obstructs opening of a vehicle door;
   outputting a suspension control signal for controlling operation of a vehicle suspension based on a determination that the detected object obstructs opening of the vehicle door;
   determining if a requested vehicle suspension change would result in the detected object obstructing opening of the vehicle door; and
   inhibiting the requested vehicle suspension change and/or requiring user confirmation to proceed with the requested vehicle suspension change.

9. A door protection method as claimed in claim 8 comprising determining a relative position and/or height of the detected object.

10. A door protection method as claimed in claim 9 comprising adjusting the height and/or orientation of the vehicle such that the detected object does not obstruct opening of the vehicle door.

11. A door protection method as claimed in claim 8 comprising inhibiting operation of the vehicle suspension subject to a user input to approve vehicle suspension changes.

12. A door protection method as claimed in claim 8 comprising determining if a requested vehicle suspension change would result in the detected object obstructing opening of the vehicle door.

13. A door protection method as claimed in claim 8 comprising outputting an alert when the detected object obstructs opening of the vehicle door.

14. A door protection method as claimed in claim 8 wherein determining if the detected object obstructs opening of the vehicle door includes determining if the detected object is within a projected opening path of the vehicle door.

15. An electronic processor configured to execute a set of computational instructions to perform the method claimed in claim 8.

* * * * *